(12) United States Patent
Stone et al.

(10) Patent No.: US 10,897,874 B2
(45) Date of Patent: Jan. 26, 2021

(54) PET TOY WITH MULTIPLE SOUND PRODUCING FEATURES AND METHOD OF ENTERTAINING AN ANIMAL

(71) Applicant: The KONG COMPANY LLC, Golden, CO (US)

(72) Inventors: John James Stone, Golden, CO (US); Amy Brickle, Golden, CO (US)

(73) Assignee: THE KONG COMPANY LLC, Golden, CO (US)

( * ) Notice: Subject to any disclaimer, the term of this patent is extended or adjusted under 35 U.S.C. 154(b) by 442 days.

(21) Appl. No.: 15/483,434

(22) Filed: Apr. 10, 2017

(65) Prior Publication Data
US 2018/0288971 A1 Oct. 11, 2018

(51) Int. Cl.
| | | |
|---|---|---|
| *A01K 15/02* | (2006.01) | |
| *G10K 9/10* | (2006.01) | |
| *G10K 15/04* | (2006.01) | |

(52) U.S. Cl.
CPC ............ *A01K 15/025* (2013.01); *G10K 9/10* (2013.01); *G10K 15/04* (2013.01)

(58) Field of Classification Search
CPC ............................ A01K 15/025; A01K 15/026
See application file for complete search history.

(56) References Cited

U.S. PATENT DOCUMENTS

| 6,123,599 A | * | 9/2000 | Chiang | ................... | A63H 5/00 |
|---|---|---|---|---|---|
| | | | | | 446/196 |
| 6,892,674 B1 | | 5/2005 | Dubinins et al. | | |
| 9,370,167 B2 | * | 6/2016 | Vap | ........................ | A01K 29/00 |
| 2015/0230429 A1 | * | 8/2015 | Mak | ..................... | A01K 15/026 |
| | | | | | 119/709 |

FOREIGN PATENT DOCUMENTS

EP 1602275 B1 6/2008

OTHER PUBLICATIONS

Ebay page For Allstar Innovations Wobble Wag Giggle Ball, Dog Toy, As Seen on TV Medium, https://www.ebay.com/itm/Allstar-Innovations-Wobble-Wag-Giggle-Ball-Dog-Toy-As-Seen-on-TV-Medium/322256450937?epid=1737336851&hash=item4b07fb3579:g:27sAAOSwXf1aXIX2, retrieved Mar. 2, 2018, pp. 1-5.

* cited by examiner

*Primary Examiner* — Monica L Barlow
(74) *Attorney, Agent, or Firm* — Berg Hill Greenleaf Ruscitti LLP.

(57) ABSTRACT

A pet toy includes two distinct noisemaking elements. The first element includes an air tube and reed housed within a middle section of the toy. Rotation of the pet toy activates noise by the air tube and reed. The second element includes a squeaker mounted within a compressible dome. Compression or re-inflation of the dome activates noise by the squeaker. A method includes providing a pet toy with the two distinct noisemaking elements and presenting the pet toy to an animal resulting in enhanced interaction with the animal by multiple sounds produced by the pet toy.

22 Claims, 5 Drawing Sheets

PET TOY WITH MULTIPLE SOUND PRODUCING FEATURES AND METHOD OF ENTERTAINING AN ANIMAL

FIELD OF THE INVENTION

This invention relates to pet toys, and more particularly, to a pet toy having multiple noise making capabilities in which noise is produced when the pet toy is compressed and when the pet toy is rotated.

BACKGROUND OF THE INVENTION

The commercialization of pet toys has significantly increased over recent years. Large retail outlets provide abundant floor space for displaying a wide range of pet products. Pet toys can be found in many shapes and sizes, as well as made from different materials. One attribute of many pet toys is those that have a sound producing capability. The production of sound can often enhance interaction of the toy with the animal.

One general category of pet toys is chew toys made of a flexible or elastomeric material. Synthetic rubber, natural rubber, TPR, and combinations thereof are known materials. These toys, if made from quality materials, can withstand the biting action of an animal and keep the animal occupied for substantial periods. It is also known to place treats in these toys to further increase interaction with the animal.

For those pet toys that produce sound, the most common sound emitting device is referred to as a "squeaker". The squeaker is typically held within the interior of the pet toy, and as the pet toy expands or contracts during contact by an animal, air flow through the squeaker produces sound. One drawback with some pet toys is that some are made of a single layer of poor quality material, and the animal will often bite through the pet toy to reach and disable the squeaker.

Another category of pet toys is those generally referred to as "plush" toys. These toys have an outer shell made from a relatively soft and flexible material, such as cloth or fabric. Some plush toys may further include material woven into strands, such as nylon fibers. A plush toy is typically stuffed with a fibrous material such as woven polyester. The stuffing provides the pet toy with a desired thickness or bulk that enables the animal to hold the toy. Because the outer shell is typically not strong enough to prevent teeth of the animal from penetrating, plush toys are prone to relatively easy destruction by vigorous chewing action of the animal. Plush toys may also include squeakers to further stimulate the animal.

Considering the common forms of construction for many types of pet toys, there is also a need to provide a pet toy that is robust enough to withstand the prolonged biting action of an animal, but is relatively simple in construction and therefore can be produced at a reasonable cost. There is also a need to provide a pet toy that has multiple responsive features that may further enhance the entertainment value of the toy for an animal.

The invention described herein overcomes many limitations in the prior art, yet incorporates a resilient, stable construction to withstand damage from prolonged biting and chewing from an animal. The invention provides multiple sources of stimulation for an animal, yet the pet toy is relatively simple in construction.

SUMMARY OF THE INVENTION

According to one preferred embodiment, the invention is a pet toy capable of making distinct sounds depending on interaction with the toy. One category of sound is produced when the toy is deformed such as by the chewing or biting action of an animal. Another category of sound is produced when the toy is rotated or turned such as by contact with the animal as it interacts with the toy.

According to another preferred embodiment, a method is provided for entertaining an animal by provision of a pet toy that generates distinct sounds depending upon how the animal interacts with the toy.

According to another preferred embodiment, the pet toy incorporates one or more squeakers such that when the pet toy is deformed, airflow is generated through the toy causing the one or more squeakers to emit sound. The toy further includes one or more air tubes with movable reeds mounted therein. When the pet toy is rotated or turned, the force of gravity causes the movable reeds to displace within the air tubes thereby producing another distinct sound.

Yet another preferred embodiment of the invention may be further described as having a central or middle section that houses one or more sound producing air tubes. When the toy is turned or rotated, displacement of the movable reeds within the respective air tubes generates a first sound. The open space within the middle section that houses the sound producing tube(s) is defined herein as a primary interior chamber.

Opposite sides of the middle or central section are bounded by elastomeric domes that are compressible to reduce the volumes of the respective interior chambers covered by the domes. A squeaker is mounted to the interior surface of one or both of the domes. The interior chambers covered by the domes are defined as secondary interior chambers. As the domes are displaced during interaction with the animal, the changes in volume of the secondary interior chambers create airflow through the squeakers to generate sound.

According to one preferred embodiment, the construction of the toy more specifically includes the middle or central section having a substantially cylindrical shape, a base wall enclosing one end of the middle section, and a removable cover enclosing an opposite end of the middle section. The one or more air tubes with slidable reeds are mounted within the primary chamber and secured to the base wall. As the toy is turned or rotated, gravity causes the slidable reeds to move within their corresponding air tubes generating the first sound. One or more vent openings may be formed on the middle section to enable drainage of water and to allow sound to be more easily emitted since the air tubes are enclosed within the primary chamber. The exposed exterior surface of the middle section may include a plurality of ribs and recesses, or other surface features, that provide a pleasing shape or that may provide structure for an animal to better bite or hold the pet toy.

According to a preferred embodiment, each opposite end of the pet toy includes the compressible dome made of an elastomeric material such that the dome is responsive to the biting or holding action of the animal. A squeaker is mounted to the interior surface of the dome and communicates with a corresponding air hole. The second sound is produced when a dome is compressed causing airflow to travel one direction through the corresponding squeaker. The dome re-inflates after compression therefore causing airflow to travel an opposite direction through the corresponding squeaker and therefore generating a third sound.

The middle section is preferably made from a material that is less resilient than the domes, yet is not overly stiff or rigid which may otherwise damage the teeth or mouth of the animal as it chews on the toy. One example of material that may be used for both the middle section and dome includes TPR. The middle section is selected from a TPR type having higher durometer hardness while the domes are selected from a TPR type having a lower hardness and being substantially elastomeric.

According to a method of the invention, a pet toy has primary and secondary interior chambers that house corresponding sound producing devices. A first sound is produced when the toy is turned or rotated. Deformation of one or more parts of the pet toy causes second and/or third sounds to be produced.

Considering the aforementioned features of the invention, in one aspect, it can be further considered as a pet toy comprising: a middle section having an open space defining a primary chamber; a first noisemaking element housed in said middle section; a first compressible member having a sidewall and a peripheral edge attached to said middle section, a secondary chamber defined as open space between said middle section and said sidewall; a second noisemaking element secured to an interior surface of said sidewall and communicating with an opening formed in said sidewall; and wherein turning or rotation of said pet toy causes said first noisemaking element to produce sound and compression of said compressible member causes said second noisemaking element to produce sound.

According to another aspect of the invention, it may be considered a pet toy comprising: a middle section having an open space defining a primary chamber; a first noisemaking element housed in said middle section; two compressible members each having a sidewall and a peripheral edge attached to said middle section, a secondary chamber defined as open space between said middle section and said sidewall; said compressible members attached to opposite sides of said middle section; and a second noisemaking element secured to an interior surface of each said sidewall and communicating with an opening formed in each said sidewall.

According to another aspect of the invention, it may be considered a pet toy comprising: a middle section having an open space defining a primary chamber; a first noisemaking element housed in said middle section; a first compressible member attached to said middle section, said first compressible member having a sidewall, a secondary chamber defined as open space between said middle section and said sidewall; a second noisemaking element secured to said first compressible member and communicating with an opening formed in said sidewall; and wherein turning or rotation of said pet toy causes said first noisemaking element to produce sound and compression of said first compressible member causes said second noisemaking element to produce sound.

According to yet another aspect of the invention, it may be considered a method of entertaining an animal comprising: providing a pet toy having first and second noisemaking elements; providing the pet toy to an animal; the animal causing the pet toy to turn or rotate thereby producing a first sound; the animal compressing one part of the pet toy thereby producing a second different sound; and the compressed part of the toy re-inflating thereby producing a third different sound.

Other features and advantages of the invention will become apparent as the invention is considered by a review of the following description of the drawings and detailed description.

DETAILED DESCRIPTION

Figure 1:
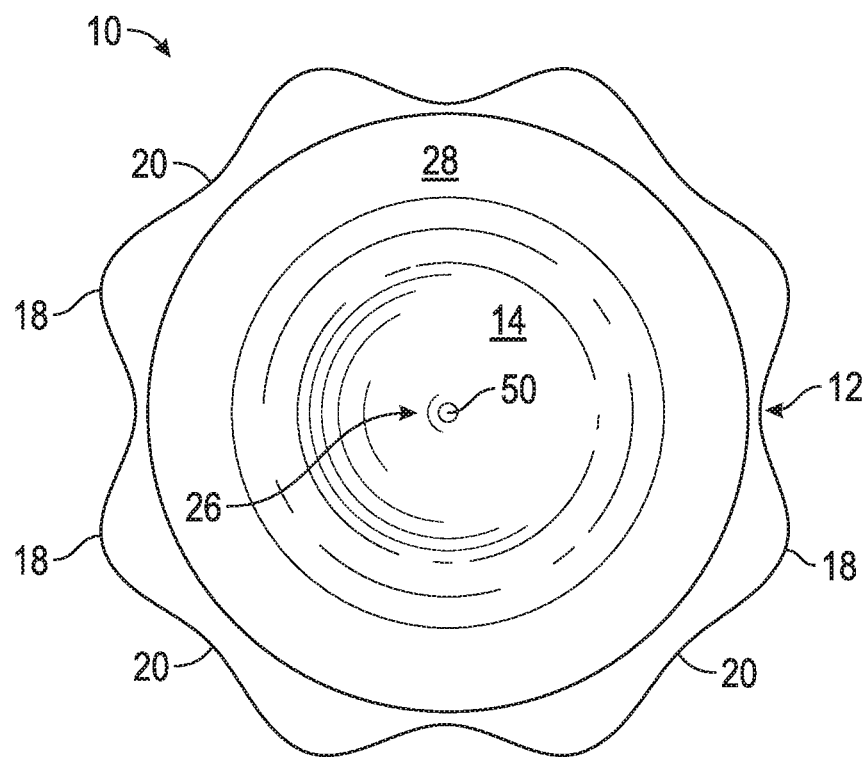
FIG. 1 is a plan view of a preferred embodiment of the invention.
Figure 2:
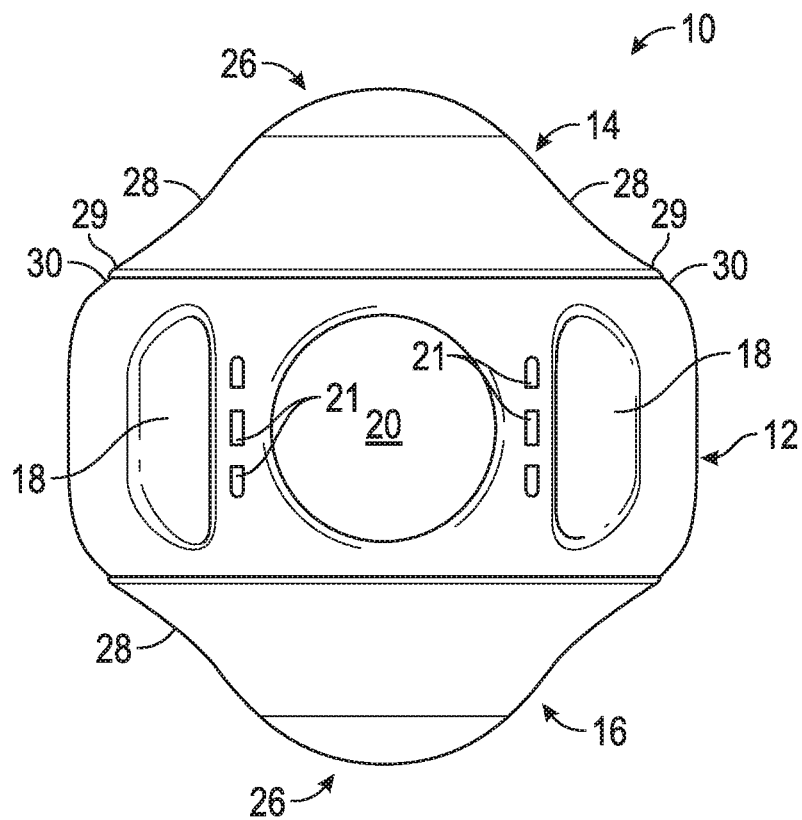
FIG. 2 is a side elevation view of the preferred embodiment.

Referring to FIGS. 1 and 2, a pet toy 10 in a preferred embodiment includes a middle section 12 bounded on opposite sides by corresponding domes 14 and 16. Each of the domes has an apex 26 and a gradual sloping surface 28. A peripheral edge 29 of each dome connects to a corresponding lip or flange 30 of the middle section. A plurality of surface irregularities is incorporated on the middle section 12. As shown, these surface irregularities include a plurality of evenly spaced ribs or protrusions 18 with recesses or indentations 20 formed between each of the ribs 18.

Figure 3:
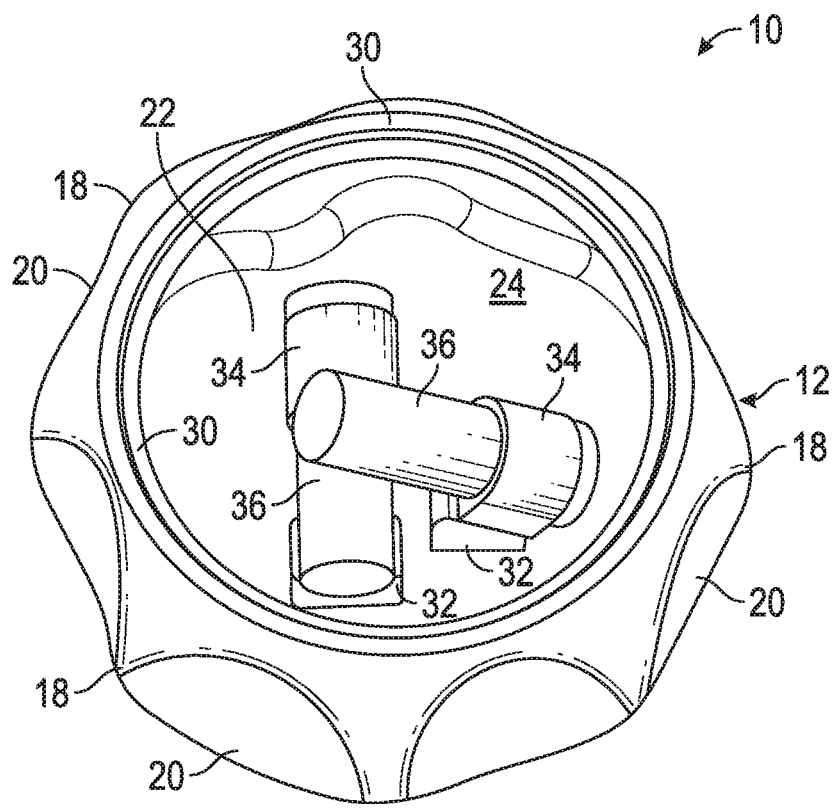
FIG. 3 is a first perspective view of the middle section of the invention exposing interior details of the middle section.
Figure 4:
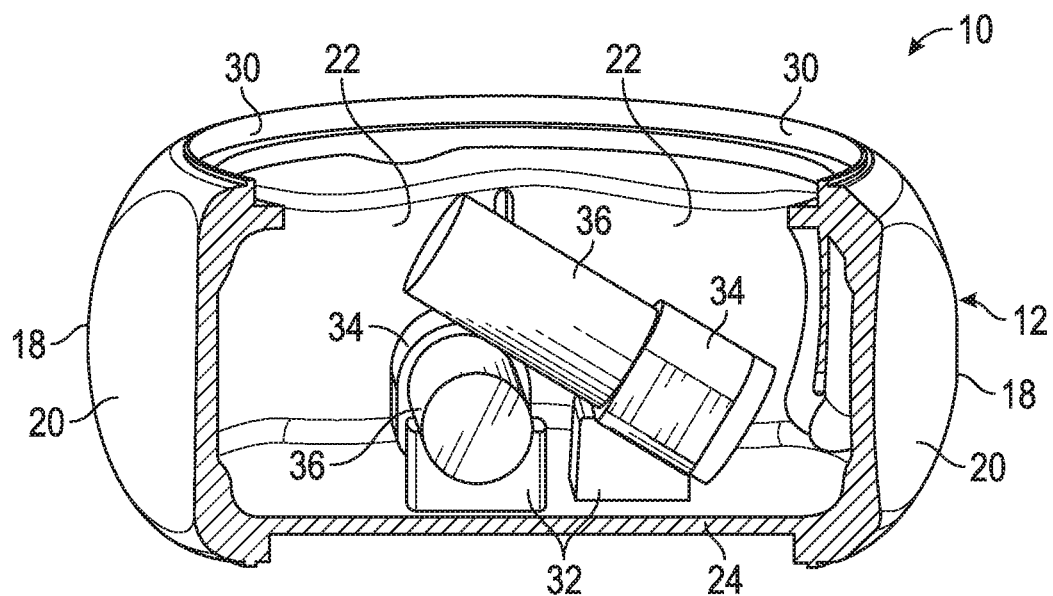
FIG. 4 is a cross-sectional view of the middle section.

FIGS. 3 and 4 illustrate interior structural details of the middle section 12. A cover 38 (FIG. 5) is removed exposing interior details. A primary chamber 22 is defined as the open space within the middle section 12. Two air tubes 36 are illustrated as mounted within the middle section 12. Structure provided for mounting the tubes includes corresponding supports 32 extending from a base wall 24 and corresponding mounting sleeves 34 that receive and hold the air tubes 36. The air tubes 36 are shown as a generally perpendicular to one another with one of the air tubes 36 having one end thereof extending above the other air tube 36. This particular arrangement allows to air tubes to be mounted within the primary chamber 22 thereby taking advantage of available space. However, it shall be understood that the air tubes 36 can be mounted within the chamber 22 in any other desired orientation or configuration, the specific orientation shown in FIGS. 3 and 4 being exemplary.

Each of the tubes 36 has a slidable reed (not shown) mounted therein. As the pet toy is turned or rotated, the reeds slide back and forth within the corresponding tubes 36 according to gravity force as one side of the toy is lowered and lifted in the turning or rotating movements. The sliding action of a reed in a corresponding tube causes air to pass through the reed thereby producing sound. A plurality of vent openings 21 is formed in the middle section 12 to enable sound to be more audibly perceived by the air tubes. The vent openings also enable drainage of water that may enter the primary chamber, such as if the pet toy is submerged.

One advantage of having the reeds disposed perpendicular to one another is that turning or rotation of the toy in two substantially orthogonal directions causes the reeds to slide thereby producing sound. Another advantage of having the reeds disposed in different planes is that turning or rotation of the toy in two other substantially orthogonal directions causes the reeds to slide thereby also producing sound. Therefore, rotation or turning of the pet toy in four different directions or different axes of rotation increases the likelihood the toy will produce sound when an animal interacts with the toy.

Figure 5:
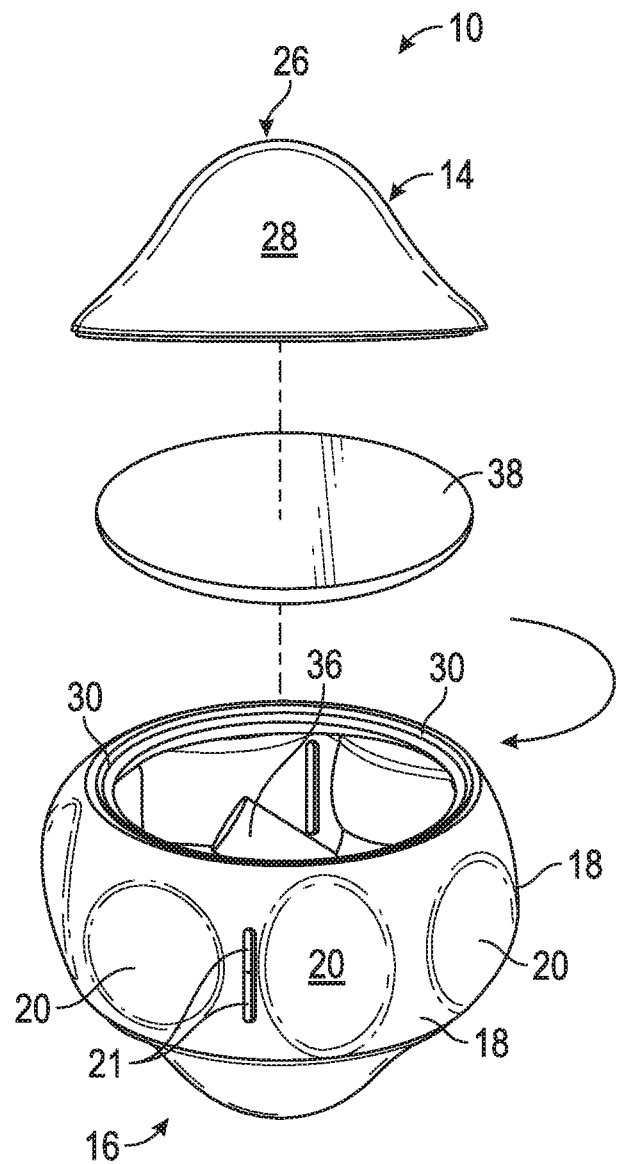
FIG. 5 is a partially exploded second perspective view of the invention.

FIG. 5 further illustrates the preferred embodiment showing the cover 38 separated from the middle section, and one of the domes 14 separated from the middle section. Also referring to FIG. 6, the secondary interior chambers of the pet toy may be defined as the spaces or gaps between the cover 38 and base wall 24 and their corresponding domes 14 and 16. When an animal chews or otherwise causes the domes 14 and 16 to deform in shape, the secondary chambers compress or re-inflate causing air to pass through the corresponding squeakers 40 that are mounted to the interior surface of the corresponding domes. More specifically, each of the domes has an air hole 50 and the squeakers are directly mounted in communication with the air holes such that when the volume of air within the secondary chambers changes, air is forced into or out of the secondary chambers thereby causing air to pass through the corresponding squeakers 40.

Figure 6:
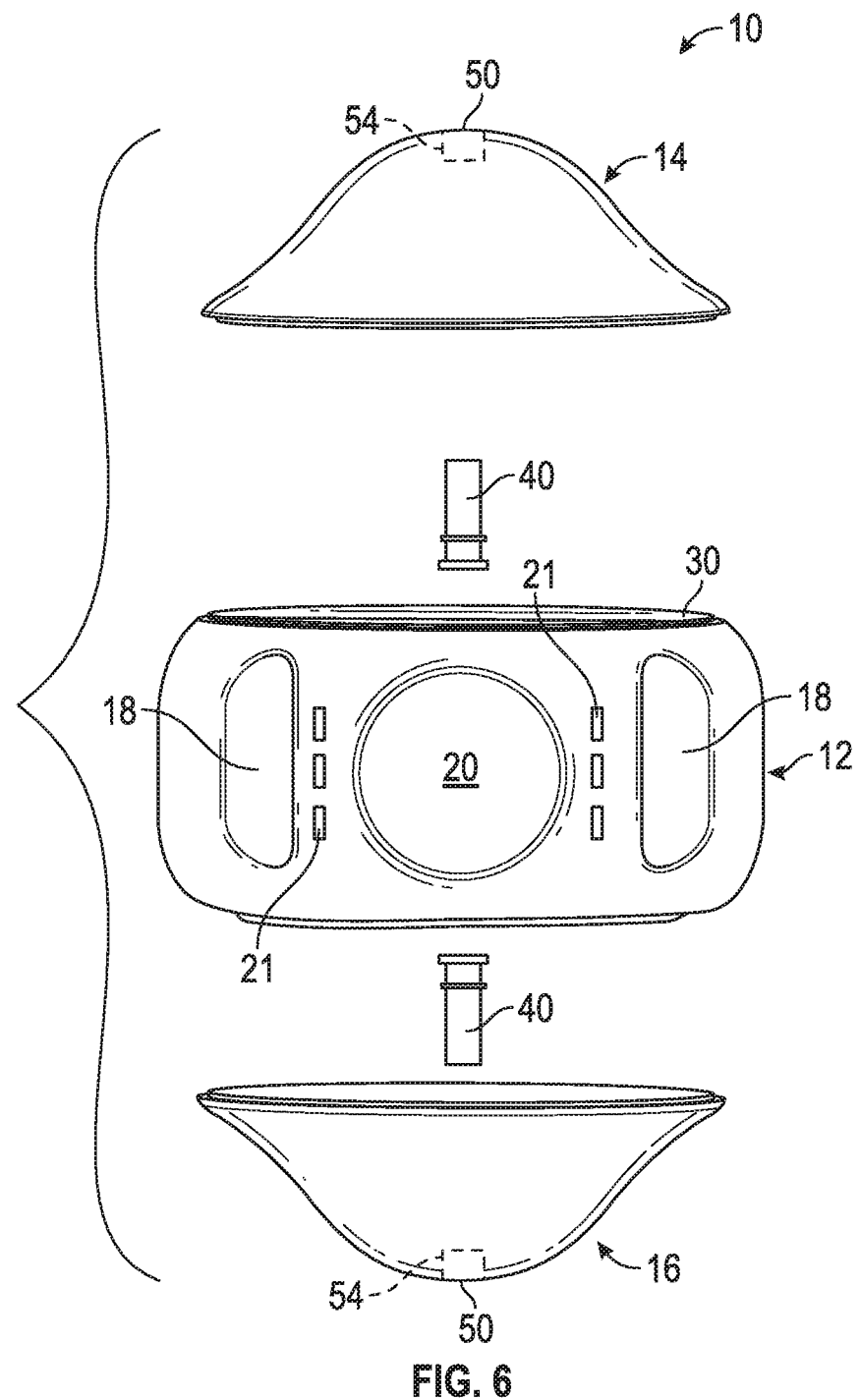
FIG. 6 is an exploded side elevation view of the invention.
Figure 7:
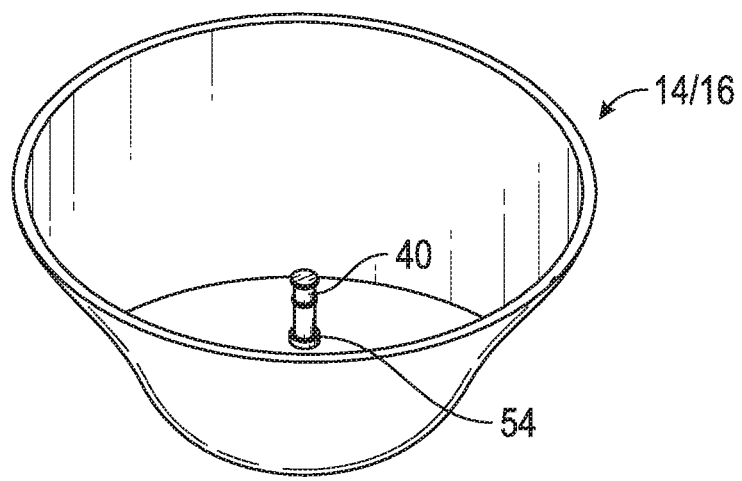
FIG. 7 is a perspective view of a dome illustrating a squeaker mounted thereto.

One method of mounting the squeakers 42 to the corresponding domes is shown in FIGS. 6 and 7. The interior surfaces of the domes may include mounting flanges 54 which protrude from the interior surfaces, these flanges 54 being used to frictionally mount the squeakers 40. The air holes 50 and the mounting flanges 54 are illustrated as positioned at the apexes 24 of the domes; however, it shall be understood that the air holes and squeakers may be mounted at any other desired locations on the domes, the apexes being one convenient location since maximum clearance space is provided within the corresponding secondary chambers at those locations. One general consideration for mounting the squeakers is that preferably, they are mounted such that when the domes are the displaced in response to force, the free ends of the squeakers 40 do not contact the middle section 12 which may otherwise dislodge the squeakers 40 from their corresponding mounting flanges 54.

Although both the air tubes 36 and squeakers 40 are shown of a specific shape including length and diameter, it shall be understood that the illustrations are simply exemplary shapes for these elements, and other types of air tubes and squeakers may be incorporated within the pet toy. Similarly, the specific shape and dimensions of the middle section and domes are illustrated in the preferred embodiment; however it will be understood that these elements may also be of different shapes and sizes, yet still accommodate functioning of the invention in which two distinct types of sound are produced by changing the volume of the secondary interior chambers and changing the orientation of the pet toy by turning or rotation.

According to a method of the invention, a pet toy is provided that has the two distinct noisemaking capabilities. A first noisemaking capability is derived from selectively compressing one or more parts on the exterior surface of the pet toy. A second noisemaking capability is derived from selectively turning or rotating the pet toy. Entertainment of an animal involves the animal interacting with the pet toy such that one or both noisemaking capabilities are realized. A first sound is produced when the animal causes the toy to be turned or rotated, such as by pawing or lifting and rotating the pet toy as it is chewed. A second and/or third sound is produced such as by the biting or chewing of the pet toy in which the domes are repeatedly compressed and re-inflated. According to a preferred embodiment of the method, the first sound can produced by turning or rotating the pet toy in one of four substantially different axes of rotation that increases the chance the second sound is produced.

One should appreciate a number of advantageous features of the invention. The device and method provide a pet toy with a number of selectively activated noisemaking features. One or more portions of the pet toy are elastomeric which provides a satisfying chew experience for an animal. The middle or central section is preferably made of a harder durometer material to protect the air tubes housed therein. Further, the middle section has exterior features which may assist the animal in holding the toy or to assist in turning or rotating the toy.

What is claimed is:

1. A pet toy comprising:
   a middle section having an open space defining a primary chamber;
   a first noisemaking element that produces sound and housed in said middle section;
   a first compressible member having a sidewall and a peripheral edge attached to said middle section, a secondary chamber defined as open space between said middle section and said sidewall;
   a second different noisemaking element that produces sound and is associated with an interior surface of said sidewall and communicating with an opening formed in said sidewall; and
   wherein turning or rotation of said pet toy causes said first noisemaking element to produce sound and compression of said compressible member causes said second noisemaking element to produce sound.

2. A pet toy, as claimed in claim 1, wherein:
   said first noisemaking element includes an air tube with a slidable reed therein such that when said pet toy is turned or rotated, the slidable reed moves within the air tube to produce a first sound.

3. A pet toy, as claimed in claim 1, wherein:
   said second noisemaking element includes a squeaker attached to an interior surface of said sidewall and communicating with an air hole formed in said sidewall such that when said first compressible member is compressed to release air from said secondary chamber or said first compressible member re-inflates, air passes through said squeaker to produce corresponding second and third sounds.

4. A pet toy, as claimed in claim 1, wherein:
   said first compressible member includes two compressible members formed at opposite sides of said pet toy and separated from one another by said middle section.

5. A pet toy, as claimed in claim 1, wherein:
   said compressible member is a dome shaped.

6. A pet toy, as claimed in claim 1, wherein:
   said middle section is cylindrical shaped.

7. A pet toy, as claimed in claim 1, wherein:
   said middle section has a plurality of exterior features formed thereon, said exterior features including a plurality of ribs and recesses.

8. A pet toy, as claimed in claim 1, further including:
   at least one vent opening formed in said middle section.

9. A pet toy comprising:
   a middle section having an open space defining a primary chamber;
   a first noisemaking element that produces sound and housed in said middle section;
   two compressible members each having a sidewall and a peripheral edge attached to said middle section, a secondary chamber defined as open space between said middle section and said sidewall;
   said compressible members attached to opposite sides of said middle section; and
   a second different noisemaking element that produces sound and is associated with at least one of said two compressible members and communicating with an opening formed in a corresponding sidewall thereof.

10. A pet toy, as claimed in claim 9, wherein:
    said first noisemaking element includes an air tube with a slidable reed therein such that when said pet toy is turned or rotated, the slidable reed moves within the air tube to produce a first sound.

11. A pet toy, as claimed in claim 9, wherein:
said second noisemaking element includes a squeaker attached to an interior surface of said sidewall of said at least one of said two compressible members, and communicating with an air hole formed in said corresponding sidewall such that when said first compressible member is compressed to release air from said secondary chamber or said first compressible member re-inflates, air passes through said squeaker to produce corresponding second and third sounds.

12. A method of entertaining an animal comprising:
providing a pet toy having first and second noisemaking elements that each produce sound;
providing the pet toy to an animal;
the animal causing the pet toy to turn or rotate thereby producing a first sound by said first noisemaking element;
the animal compressing one part of the pet toy thereby producing a second different sound by said second noisemaking element; and
the compressed part of the toy re-inflating thereby producing a third different sound.

13. The method, as claimed in claim 12, wherein:
the first noisemaking element includes an air tube with a slidable reed disposed therein.

14. The method, as claimed in claim 12, wherein:
the first noisemaking element is mounted within a middle section of the pet toy.

15. The method, as claimed in claim 12, wherein:
the second noisemaking element is mounted within a compressible dome attached to a middle section of the pet toy.

16. The method, as claimed in claim 12, wherein:
the second noisemaking element includes a squeaker mounted to an interior surface of a compressible dome attached to a middle section of the pet toy.

17. The method, as claimed in claim 12, wherein:
the first noisemaking element is activated to produce sound by turning or rotating the pet toy in at least one axis of rotation of four axes of rotation.

18. The method, as claimed in claim 12, wherein:
the compressible part of the pet toy is elastomeric.

19. A pet toy comprising:
a middle section having an open space defining a primary chamber;
a first noisemaking element that produces sound housed in said middle section;
a first compressible member attached to said middle section, said first compressible member having a sidewall, a secondary chamber defined as open space between said middle section and said sidewall;
a second noisemaking element that produces sound associated with said first compressible member and communicating with an opening formed in said sidewall; and
wherein turning or rotation of said pet toy causes said first noisemaking element to produce sound and compression of said first compressible member causes said second noisemaking element to produce sound.

20. A pet toy, as claimed in claim 19, wherein:
said second noisemaking element is attached to an interior surface of said sidewall.

21. A pet toy comprising:
a middle section having an open space defining a primary chamber;
a first noisemaking element producing sound housed in said middle section;
a compressible member having a sidewall and a peripheral edge attached to said middle section, a secondary chamber defined as open space between said middle section and said sidewall;
a second noisemaking element producing sound associated with an interior surface of said sidewall and communicating with an opening formed in said sidewall;
at least one vent opening formed in said middle section, said vent opening being a third noisemaking element producing sound wherein; and
wherein turning or rotation of said pet toy causes said first noisemaking element to produce sound and compression of said compressible member causes said second and third noisemaking elements to produce sound.

22. The pet toy, as claimed in claim 21, further including:
an air hole formed in said first compressible member, said air hole being a fourth noisemaking element wherein compression of said compressible member causes said fourth noisemaking element to produce sound.

* * * * *